W. H. LIEBER.
ENGINEER'S VALVE.
APPLICATION FILED NOV. 26, 1909.
952,434.
Patented Mar. 15, 1910.
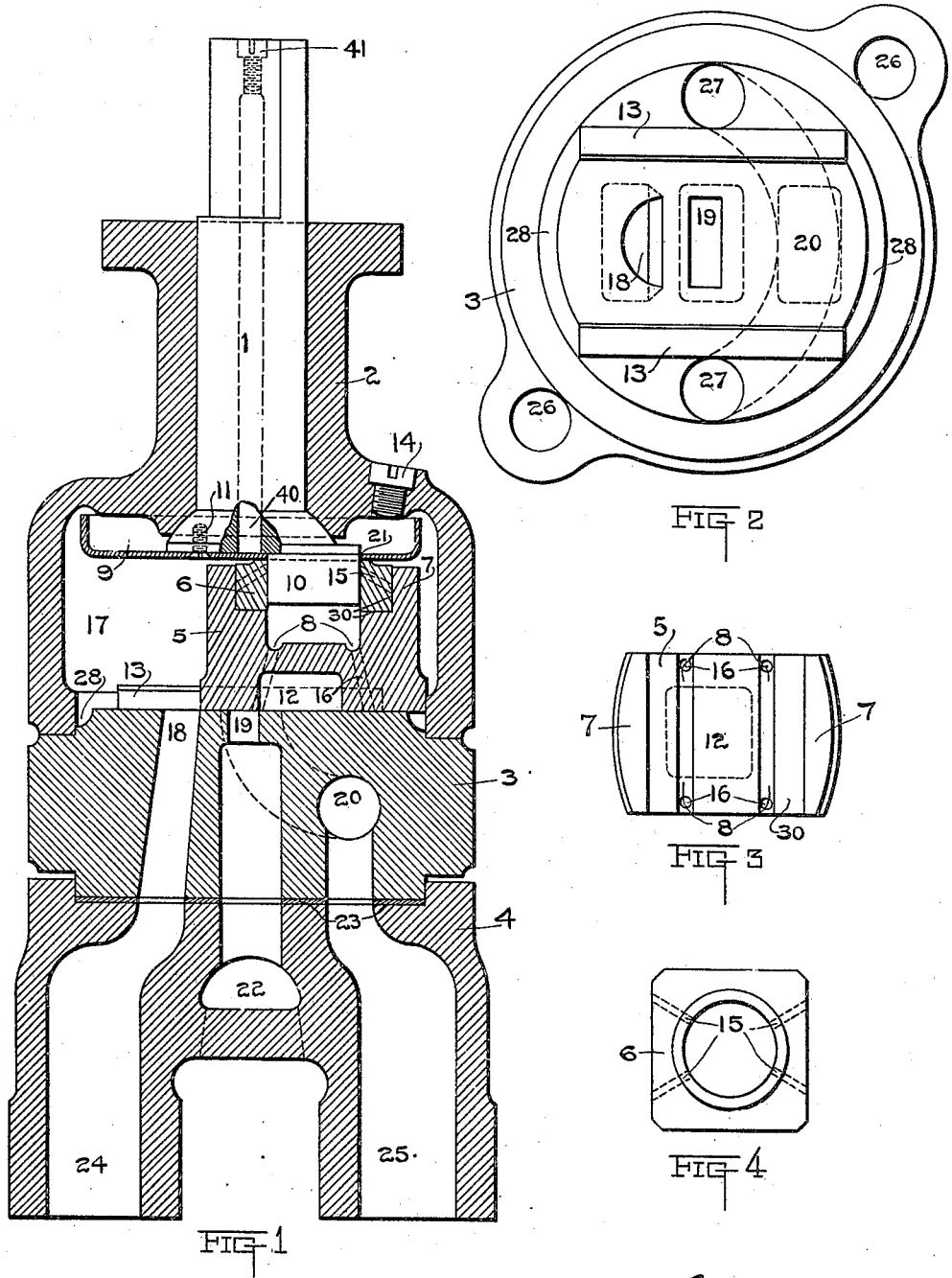
WITNESSES:
H. Case
Ella Brickell
W. H. Lieber INVENTOR.
BY
ATTORNEY.

UNITED STATES PATENT OFFICE.

WILLIAM H. LIEBER, OF MILWAUKEE, WISCONSIN, ASSIGNOR TO ALLIS-CHALMERS COMPANY, OF MILWAUKEE, WISCONSIN, A CORPORATION OF NEW JERSEY.

ENGINEER'S VALVE.

952,434. Specification of Letters Patent. Patented Mar. 15, 1910.

Application filed November 26, 1909. Serial No. 529,922.

*To all whom it may concern:*

Be it known that I, WILLIAM H. LIEBER, a citizen of the United States, residing at Milwaukee, in the county of Milwaukee and State of Wisconsin, have invented a certain new and useful Engineer's Valve, of which the following is a specification.

This invention relates to improvements in the construction of engineers' valves and particularly to devices for lubricating engineers' valves of the type used in connection with air brake systems.

An object of the invention is to provide a simple and efficient oiling device for engineers' valves in which lubricant is supplied to all of the working surfaces of the mechanism.

Another object is to have the lubricating system so arranged that any surplus oil which is fed to the upper working parts of the valve will flow to other parts of the valve and be utilized in lubricating such parts.

A clear conception of the invention can be obtained by referring to the accompanying drawing in which like reference characters designate the same or similar parts in different views.

Figure 1 is a central vertical section of an engineer's valve built in accordance with the invention. Fig. 2 is a plan of the valve seat. Fig. 3 is a plan of the valve. Fig. 4 is a plan of the valve cross-head.

The body of the engineer's valve, see Fig. 1, is built up of three essential parts, the upper casing or cap 2, the valve seat 3, and the base 4. Each of these parts has lugs provided with holes 26 formed on its outer surface, through which holes 26, suitable clamping bolts, not shown, are passed, thus uniting the cap 2, valve seat 3 and base 4, to form the body. The gasket 23 placed between the seat 3 and base 4, insures an air tight connection between these members.

The valve stem 1, having the eccentrically formed pin 10 at its lower end, is mounted concentrically in the upper portion of the cap 2. A passage or chamber 40 is formed concentric with the stem 1 and extends throughout the entire length of the stem 1, being closed at its upper end by the screw 41 and almost closed at its lower end by the oil pan 9. The oil pan 9 has an eccentric hole 21 in its bottom which allows the passage of the eccentric pin 10 therethrough, the pan 9 being loosely fastened to, and concentrically with, the bottom of the stem 1 by means of the screws 11. An opening in the casing 2 above and within the limits of the pan 9, is normally closed by a set screw 14.

The eccentric pin 10 of the stem 1 is fitted into a bored hole in the cross-head 6, see Fig. 4. The cross-head 6 is supported by horizontal upper surfaces of the valve 5, and is slidably mounted between guides 7, see Fig. 3, at the top of the valve 5 coacting between parallel vertical surfaces extending upwardly from horizontal upper surfaces 30 of the valve 5. The oil holes 15 extend from the bore of the cross-head 6 to the surfaces 30 of the valve 5, and preferably in an outwardly downward direction.

The valve 5 rests upon an upper horizontal surface of the seat 3, and has parallel side surfaces formed at right angles to its upper surfaces 30, which side surfaces coact between parallel guides 13 on the seat 3. These guides 13 may be formed on the valve 5 instead of the seat 3, but this is not a feature of the present invention. The valve 5 has grooves 8 formed in an upper surface below the surfaces 30 and between the guides 7. Oil holes 16 extend from points near the outer ends of these grooves 8 to the seating surface of the valve 5, the holes 16 being formed so as to avoid entering the cavity 12 at the bottom of the valve 5.

The valve seat 3 has passages 18, 19, passing through it, see Figs. 1, 2, which passages 18, 19 connect with corresponding passages 24, 22, in the base 4 at their lower ends and emerge into the interior 17 of the casing 2 at their upper ends. The passages 18, 19, emerge from the seat 3 in the horizontal valve seating surface between the guides 13. The passages 27 emerge from the seat 3 not within the seating surface, these passages 27 uniting into a single passage 20, which passage 20 connects with the passage 25 in the base 4. Grooves or oil pockets 28 are formed on top of the seat 3 near its coaction with the cap 2 and between the guides 13.

During the operation of lubricating the valve, the air pressure which normally exists within the chamber 17, is released by closing a valve, not shown, in the pressure supply pipe 25. The screw 41 at the top of the stem 1 is removed and oil is admitted through the passage 40 to the oil pan 9. If the amount of opening between the stem 1 and the pan 9, produced by the relaxed condition of the screws 11, is not sufficient to allow the flow of oil therethrough, a small radial groove may be cut in the bottom of the stem 1, extending from the lower end of the passage 40 to the outer surface of the stem 1. Another means of admitting oil to the pan 9 is by removing the screw 14 and pouring the lubricant directly into the pan 9 through the opening. After the pan 9 has been filled, the screws 41, 14, are replaced and the pressure again established in the interior 17 of the casing 2. The establishing of this pressure causes a portion of the oil from the pan 9 to be forced up between the stem 1 and the cap 2, thus causing an oil packing between the stem 1 and cap 2. As the stem 1 is rotated in operating the valve 5, the oil from the pan 9 flows through the opening 21 in the bottom of the pan 9 onto the vertical surface of the eccentric pin 10. The amount of flow thus obtained may be regulated by increasing or decreasing the clearance between the pin 10 and sides of the hole 21. As the oil flows down the pin 10, a portion thereof upon reaching the holes 15, passes through to the surfaces 30 on top of the valve 5, thus oiling the surfaces 30. From the surfaces 30, the major portion of the oil fed thereto through the holes 15 is wiped directly over the edges by the crosshead 6 to the side surfaces of the valve 5 and flows to the seat 3 between the valve 5 and the guides 13. The oil which flows down the pin 10 and is not led away through the holes 15, eventually drips off the bottom of the pin 10 and falls in the grooves 8 on top of the valve 5. From these grooves 8 the oil passes through the holes 16 to the seating surfaces of the valve 5. As the valve 5 is moved over the seat 3, a portion of the oil discharged thereon is wiped into the passages 18, 19, the remaining portion being wiped into the grooves 28.

The pan 9 is preferably made of sheet metal stamped into form, thus making a simple, cheap and efficient construction.

It should be understood that it is not desired to be limited to the exact details of construction shown and described, for obvious modifications will occur to a person skilled in the art.

It is claimed and desired to secure by Letters Patent,—

1. In an engineer's valve, a stem, a valve, a crosshead between said stem and valve, a pan for containing lubricant mounted on said stem, said pan adapted to discharge lubricant to said crosshead and said valve.

2. In an engineer's valve, a stem, a valve operated by said stem, a pan mounted on said stem, and means for supplying oil to said pan, said stem and pan being loosely associated for discharging oil from said pan to said valve.

3. In an engineer's valve, a casing, a stem extending into said casing, a liquid carrying means on said stem, and a valve operable by said stem, said casing projecting into the liquid carrying means, and the elements being associated to feed liquid from said liquid carrying means to said valve.

4. In an engineer's valve, a stem, a valve operable by said stem, a pan on said stem, and means for supplying oil to said pan through said stem, the elements being loosely associated and having ports and passages for conveying oil from said pan to said valve.

5. In an engineer's valve, a stem, an eccentric pin on said stem, a crosshead on said pin, and a valve supporting said crosshead, the elements being loosely associated and having ports and passages for conveying oil from said stem to said pin, from said pin to said crosshead, and from said crosshead to said valve.

6. In an engineer's valve, a casing, a rotatable means extending into said casing, a liquid carrying means on said rotatable means, and a valve operable by said rotatable means, said casing projecting into said liquid carrying means and the elements being associated to continuously supply liquid from said liquid carrying means to said valve.

7. In an engineer's valve, a stem, an oil pan on said stem, a casing supporting said stem and extending down on said stem to a point below the top of said pan, and a valve operable by said stem, the elements being loosely associated and having ports and passages for conveying oil from said pan to said valve.

8. In an engineer's valve, a casing, a stem extending into said casing, a valve operable by said stem, and means within said casing for retaining liquid, said casing projecting into said retaining means, and said elements being associated to supply liquid from said retaining means to said valve.

9. In an engineer's valve, a casing, a stem extending into said casing, an open pan mounted on said stem and adapted to carry a lubricant, and a valve operable by said stem.

10. In an engineer's valve, a casing, a rotatable stem extending into said casing, an open pan for containing a lubricant mounted on said stem, and a valve operable by said stem.

In testimony whereof, I affix my signature in the presence of two witnesses.

WILLIAM H. LIEBER.

Witnesses:
H. C. CASE,
G. F. DELLEIN.